E. A. SPERRY.
WIRE WOUND GYRO ROTOR.
APPLICATION FILED NOV. 26, 1918.

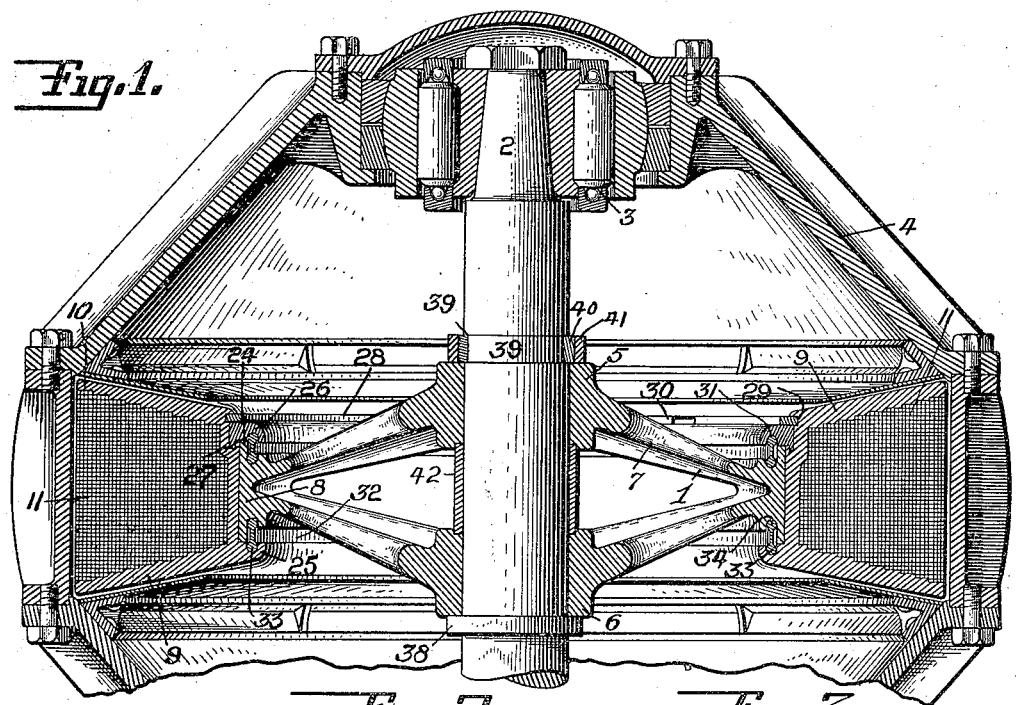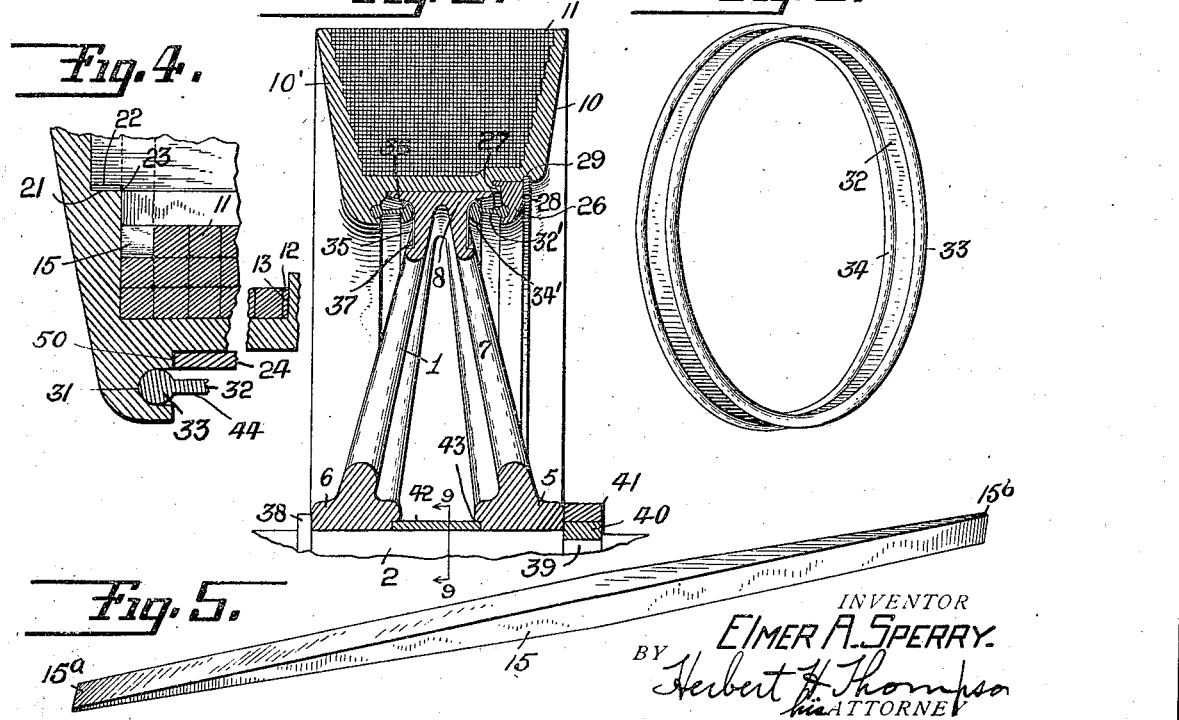

1,426,339.

Patented Aug. 15, 1922.
2 SHEETS—SHEET 2.

INVENTOR
Elmer A. Sperry.
BY Herbert H. Thompson
his ATTORNEY

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

WIRE-WOUND GYRO ROTOR.

1,426,339.   Specification of Letters Patent.   Patented Aug. 15, 1922.

Application filed November 26, 1918. Serial No. 264,160.

*To all whom it may concern:*

Be it known that I, ELMER A. SPERRY, a citizen of the United States of America, residing at 1505 Albemarle Road, Brooklyn, in the county of Kings and State of New York, have invented certain new and useful Improvements in Wire-Wound Gyro Rotors, of which the following is a specification.

This invention relates to fly wheels, particularly to wheels of large size and more specifically to wheels used for rotors in gyroscopic stabilizers for ships or other large bodies.

In ordinary fly wheels the only appreciable strain exerted upon the wheel in operation is centrifugal force, while in gyroscopic stabilizers the precessional forces set up powerful lateral strains tending to throw one-half of the wheel to one side and the other half to the other side. These powerful lateral stresses transmitted from the rim to the hub and axle or shaft through the web which joins the rim to the hub, necessitate a strong web to prevent collapsing or buckling. For this reason also, the practice is to construct the wheel with a smaller diameter and a larger rim and to rotate it at a much greater speed. The strains are so great, however, that the tendency of the wheel to burst is still considerably greater than in the case of ordinary fly wheels. An unusually strong rim is therefore highly necessary.

It is also well known that when heavy fly wheels of large diameter are rotating at high speed, centrifugal force effects an appreciable expansion of the rim, tending to cause it to separate from the web.

The principal objects of the invention are to provide a rotor having a rim capable of withstanding all of the strong and varied forces acting upon it; to provide a web simple in structure and strong enough to bear the strains produced by the precessional forces; to so mount the rim upon the web that when the rim tends to expand away from the web these two portions will continue to be securely connected to each other; and to so arrange this connection that the expansion of the rim will not loosen the hub on the shaft.

Another important object is to provide a wheel which will not require the fineness of adjustment commonly necessary in gyroscopic rotors, by providing a rim having sufficient flexibility to rotate about its own center of gyration.

Other objects will appear as the description of the invention progresses.

Referring to the drawings wherein I have shown what I now consider to be the preferred form of my invention—

Fig. 1 is a sectional side elevation of the rotor as it appears mounted upon a vertical shaft within the rotor casing.

Fig. 2 is a section of a portion of the wheel showing a slight modification in the method of securing the rim to the web.

Fig. 3 is a perspective view of a type of band used in effecting the resilient connection between the rim and web.

Fig. 4 is a detail illustrating the method of building up the rim.

Fig. 5 is a view of a wedge used in elevating the wound material from one layer to the next.

Figure 6:
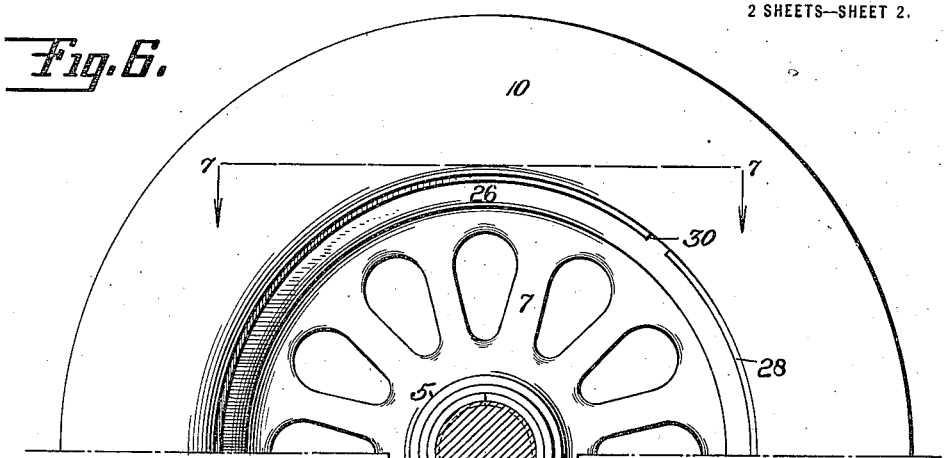
Fig. 6 is a side elevation of a portion of the wheel.

In Fig. 1 the rotor is shown at 1, mounted on a vertical shaft 2 which is in turn mounted on roller bearings 3 within a rotor casing 4. The hub or hubs of the wheel are shown at 5 and 6, interconnected by a web 7, having a periphery 8 upon which the rim 9 fits.

The rim is shown as comprising a trough or channel-like retainer 10. The inside of the trough may be filled with windings of wire 11. Preferably the wire is rectangular so that it will fill all of the space within the trough, and the proper weight may be obtained within a minimum amount of space.

Figure 7:
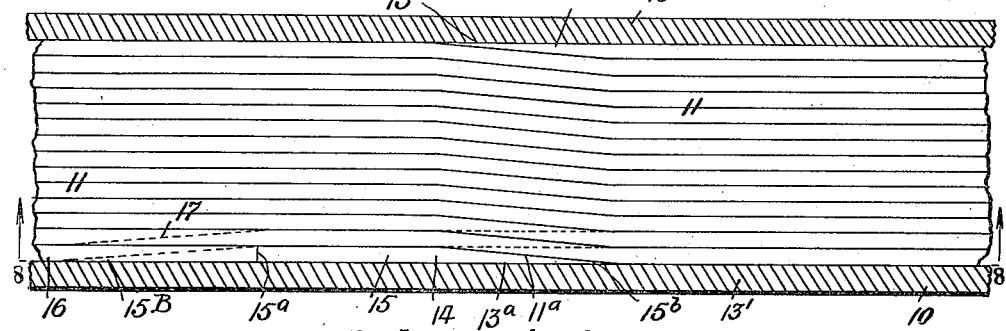
Fig. 7 is a sectional view on an enlarged scale taken approximately on line 7—7, Fig. 6.
Figure 8:
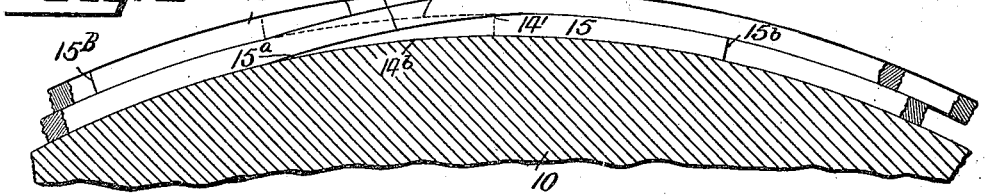
Fig. 8 is a section taken on line 8—8, Fig. 7.
Figure 9:
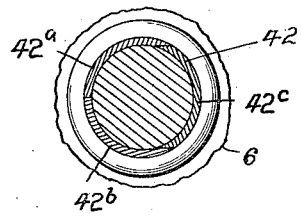
Fig. 9 is a detail showing the manner of inserting struts for spreading the hub members of the wheel.

In the winding of the wire, the starting end may be full size or it may be tapered as shown at 12 (Figs. 4 and 7) so as to spread gradually from the side 13 of the retaining trough 10 to the full width of the wire 11; the end 12 being preferably secured to said container in any suitable manner, as by welding or brazing or otherwise. The tapering of the wire at 12, while shown as rather abrupt, will of course be very gradual, extending over a large part of the circumference of the wheel. The wire is then wound close to the side 13 until it completes a turn, when it follows the tapered end 12 and makes a second turn lying against the first. Each successive turn follows a similar path until the opposite side 13' of trough 10 is reached, and substantially a complete turn made against said side. As the wire now approaches the point 14, where the preceding turn begins to edge in toward side 13' it must begin to rise so as to ride upon the first layer of wire somewhat as shown at 14' (Fig. 8). A wedge-shaped space now remains between the side of wire 11 at 11$^a$ and the side 13' of trough 10 at 13$^a$. A second wedge-shaped space will remain between the under side of wire 11 at 11$^b$ and the bottom of the trough at 14$^b$, where the wire rises from one layer to the next. These two spaces may be filled by a single double wedge 15, tapering in normal planes and preferably on one side only, or in other words from the middle down to one end 15$^a$, in vertical section and from the middle out to the other end 15$^b$ in horizontal section; one edge in each instance remaining straight. A perspective view of this double wedge is shown in Fig. 5. In both Figs. 7 and 8 the sharpness of the angle in the bending in the wire is greatly exaggerated for the sake of clearness. In practice, with comparatively stiff drawn wire, it is preferable to allow a very gradual rise from one layer to another so that the wedges employed would extend from 90° to 360° around the circumference of the wheel. Also, it will be understood that the actual length of the wedges used will vary as the depth of the layers increases. The largest cross-section of the wedge, which of course occurs at the middle, is preferably equal to that of the wire. Also, where the wire nears the completion of the first turn of the second layer, as at 16, it must begin to slant away from the wall 13' of trough 10 as indicated by dotted lines 17 (Fig. 7), so as to take its position beside the rising portion 18 as indicated by dotted lines 19 (Fig. 8). A double wedge-shaped space is thus left between the section 17 of the wire and the side of the trough 10, and extending up over the top of the rising portion 18 of the wire to the point 20. A second double wedge 15' substantially similar to wedge 15, tapering on one side to its end 15$^B$ and on an adjacent side to the other end 15$^A$ may be provided to fill this space. Layer upon layer of wire may thus be wound until the trough or rim container 10 is filled, the outer end of the wire being fastened in any suitable manner to the trough 10.

I desire also to reinforce the sides of the trough 10 so that they may properly withstand the centrifugal force which will be imparted to them in operation. For this purpose the inner surface of the sides of the rim may flare outwardly and have their surface cut in rectangular steps as shown, and the width of the layers of wire increased from time to time to overlap each step. The width and height of each step is preferably equal at least to one or more corresponding dimensions of the wire. The surface of the steps 21 may be left rough and slightly higher than necessary as indicated by dotted lines 22, and machined to the proper point during the process of winding so as to be precisely flush with the top of the adjacent layer of wire as at 23, so that the succeeding layer may run smoothly upon the step. The wire will thus furnish radial support to the sides as well as to the bottom of the channel-shaped rim against the action of centrifugal forces. In this connection, it will be seen that when the wire rises up the incline of wedge 15, it must wind across the full width of the trough and back again before it overlaps step 21. This will afford sufficient time and an ample number of turns for machining the step as the winding progresses. Another method which may be found preferable is to sever the wire when it is desired to machine a step and to weld the wire together again and dress it to size. By constructing the rim in this manner, it will be seen that the centrifugal force of the sides of the trough will be opposed by layers of wire and the trough thus strengthened.

In the winding of the rim, the wire will, of course, be applied under tension sufficient to make the rim solid. Preferably the tension should increase slightly as the winding progresses, so that each successive layer will be under a slightly greater tension than the preceding layer. The reason for this is that each successive layer, being a greater distance from the center of the wheel, will be subject to greater centrifugal force. Thus the spinning of the wheel will not throw the layers away from each other. On the other hand, the outer layers should not be under so great tension as to have to support a large part of the expansive forces of the inner layers.

While I have described the winding as comprising one continuous wire, each end of which is welded or otherwise secured to the rim, I may use a separate piece for each layer and secure the two ends of each piece to the rim thus avoiding the tendency toward equalization of the strain under which the successive layers are applied. Still a third method is to use separate pieces, but to weld them together where they join thus forming a continuous wire when complete.

It will be clearly apparent that a rotor rim built up according to my invention will be vastly stronger than ordinary fly wheels, since each strand of wire, whether of ordinary wire material or of high grade steel, will have a much greater tensile strength than a corresponding cross section of cast metal used in the latter types of wheels.

While I have shown the wire 11 as being square in cross section, it is obvious that any suitable cross section may be employed, or that the wire may assume the form of strips of metallic ribbon of any suitable width and thickness. Also, while not shown, the corners of the wire are preferably rounded off slightly.

In fly wheels running at high speeds, there is a tendency for the rim to expand away from the spokes or web. If this were permitted to take place, slippage is apt to result between the rim and web, permitting the rim to lag and the web to race intermittently. To overcome this I have devised a method and means for securing the rim and web, which, while permitting the expansion of the rim, will maintain a firm unity between the rim and web. In this connection the periphery 8 of the web 7 is shown as extending outwardly on each side as at 24 to furnish a broad and secure seat for the rim, while one side of the trough portion 9 of the rim is shown as reaching in beyond said projection as at 25 toward the center of the wheel. A similar but detachable projection 26 is shown on the opposite side of the rim, interlocked therewith as by means of an annular projection 27 reaching into a corresponding groove in said rim trough 9, and held in place by a ring-like member 28 inserted in a corresponding groove 29 in the trough. Said member 28 may be broken as at 30 to permit the necessary reduction in its diameter to spring it into place. Each of said projections 25 and 26 is shown as having a groove 31 (see also Fig. 4). A band 32 having enlarged and rounded edges 33 and 34 may be placed under said projections 24 of web 7, and engaging the rim in grooves 31. The said bands may be so constructed, as for instance with respect to size, that when in the assembled wheel, they will exert an initial strain tending to hold the rim tightly down on the web. In constructing the parts to effect this result, the inner edge 34 of the band may be made to fit tightly against the inner circumference of projection 24 of the web, while the diameter of the band at its outer edge 33 may be slightly less than that of the annular groove 31 into which it fits. Force will then be necessary in assembling the wheel, resulting in slightly dishing or expanding the band.

In Fig. 2 I have shown straps 35 reaching around the inner edge 34' of band 32' and secured thereto as by means of screws or the like 36, and also secured to web 7 as at 37. This will provide a rolling abutment between the band 32' and the web. Also in making the fastening at 37 a pull may be exerted upon the strap 35, tending to hold the rim in firm engagement with web 7 of the wheel by supplying an initial tension to said band.

When the rim expands and tends to separate from the web 7, it will pull the edge 33 of the band 32 along with it; the space between the projection 24 of the web and the central portion 44 of the band (Fig. 4) being sufficient to permit such movement.

This resilient connection between the rim and web will permit the expansion of the hub to take place, maintaining a good connection between the rim and web, without causing the rim to exert such a pull upon the hub as to loosen the latter from the shaft. It will also be noted that while bands 32 form a resilient radial connection between the hub and rim, they will prevent relative lateral movements of the web and rim. In this connection, the spreading portion 24 of the periphery of the web may engage a shoulder 50 on the rim (Fig. 4) for preventing relative lateral movements.

To restrain the wheel against lateral movement on shaft 2, said shaft may be provided with a shoulder 38 for hub 6 to rest against, while adjacent the hub 5, a groove 39 may be cut around the shaft. A broken ring 40 (see also Fig. 6) may be placed in said groove and a closed ring 41 placed over said broken ring. Ring 40 will prevent movement of the hub, while ring 41 will serve to hold ring 40 in place.

In order to prevent the radial forces on the web 7 from pulling the hub portions 5 and 6 toward each other and loosening them on the shaft, I have shown a strut 42 inserted between said hubs adjacent the periphery of the shaft, for holding them apart. To facilitate the insertion of this strut, it may comprise a plurality of parts $42^a$, $42^b$, and $42^c$. After the parts $42^a$ and $42^b$ are in place, the part $42^c$ will readily slide into its place. Shoulders 43 on the hubs will serve to prevent displacement by centrifugal force or otherwise.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a fly wheel, a hub, a rim, means connecting said hub and said rim, said rim including a plurality of layers of wire, the tension of the layers varying in proportion to the forces they are called upon to withstand.

2. In a fly wheel, a hub, a web portion, a hollow rim mounted on said web, a plurality of layers of wire wound within said hollow rim and means for filling the space left where the wire rises from one layer to the next.

3. In a fly wheel, a hub, a web member on said hub, and a rim on said web, said rim comprising a trough-like retainer, rectangular drawn wire circumferentially wound therein and a wedge which tapers toward each end in different planes interposed where one layer rises to the succeeding layer.

4. The process of winding wire circumferentially within a hollow rim retainer having step-like inner walls which comprises rotating said retainer, applying the wire during said rotation, machining said steps successively during said rotating and winding to a point substantially even with the top of a corresponding layer of wire and causing the succeeding layer of wire to overlap said step.

5. In a fly wheel, a hub and web, a rim mounted on said web, a pair of closed circular bands each locked to said web at one of its edges and to said rim at the other of its edges, and straps interposed between said web and bands, said straps being attached at one end to said band and at the other to said web for causing a rolling contact between said bands and said web.

6. In a fly wheel, a hub and web, a rim mounted on said web, a pair of closed circular bands each locked at one of its edges to said web, and straps interposed between said web and bands, said straps being attached at one end to said band and at the other to said web, and being secured in place under tension.

7. In a fly wheel, a hub, a web member on said hub, and a rim on said web, said rim comprising a trough-like retainer, rectangular drawn wire circumferentially wound therein and a wedge which tapers toward each end in different planes interposed where one layer rises to the succeeding layer, said wedge encompassing said rim through an angle of at least 90°.

8. In a fly wheel, a hub, a web member on said hub, and a rim on said web, said rim comprising a trough-like retainer, rectangular drawn wire circumferentially wound therein and a wedge which tapers toward each end in different planes interposed where one layer rises to the succeeding layer, the cross section of said wedge at its middle being substantially equal to the cross section of said wire.

9. In a fly wheel, a pair of hubs, a conical web portion connecting said hubs, a wire wound rim on said web portion and means for spreading said hubs.

In testimony whereof I have affixed my signature.

ELMER A. SPERRY.